(12) United States Patent
Starr et al.

(10) Patent No.: US 7,536,362 B2
(45) Date of Patent: May 19, 2009

(54) METHOD FOR SELECTING AN OPTIMAL BALANCE BETWEEN DIRECT COST AND A NUMBER OF SUPPLIERS

(75) Inventors: John Starr, Leechburg, PA (US); Javier Pena, Pittsburgh, PA (US)

(73) Assignee: Ariba, Inc., Sunnyvale, CA (US)

( * ) Notice: Subject to any disclaimer, the term of this patent is extended or adjusted under 35 U.S.C. 154(b) by 630 days.

(21) Appl. No.: 10/045,503

(22) Filed: Nov. 7, 2001

(65) Prior Publication Data

US 2003/0101068 A1  May 29, 2003

(51) Int. Cl.
*G06F 17/00* (2006.01)
(52) U.S. Cl. .................................................... 705/400
(58) Field of Classification Search ............... 705/37, 705/36, 1
See application file for complete search history.

(56) References Cited

U.S. PATENT DOCUMENTS

| | | | |
|---|---|---|---|
| 3,581,072 A | 5/1971 | Nymeyer | |
| 3,863,060 A | 1/1975 | Rode et al. | |
| 4,597,045 A | 6/1986 | Kiuchi | |
| 4,674,044 A | 6/1987 | Kalmus et al. | |
| 4,789,928 A | 12/1988 | Fujisaki | |
| 4,799,156 A | 1/1989 | Shavit et al. | |
| 4,845,625 A | 7/1989 | Stannard | |
| 4,992,940 A | 2/1991 | Dworkin | |
| 5,136,501 A | 8/1992 | Silverman et al. | |
| 5,193,056 A | 3/1993 | Boes | |
| 5,243,515 A | 9/1993 | Lee | |
| 5,297,032 A | 3/1994 | Trojan et al. | |
| 5,375,055 A | 12/1994 | Togher et al. | |
| 5,394,324 A | 2/1995 | Clearwater | |
| 5,402,336 A | 3/1995 | Spiegelhoff et al. | |
| 5,606,602 A | 2/1997 | Johnson et al. | |
| 5,629,982 A | 5/1997 | Micali | |
| 5,640,569 A | 6/1997 | Miller et al. | |
| 5,664,115 A | 9/1997 | Fraser | |
| 5,684,963 A | 11/1997 | Clement | |
| 5,689,652 A | 11/1997 | Lupien et al. | |
| 5,715,402 A | 2/1998 | Popolo | |

(Continued)

FOREIGN PATENT DOCUMENTS

EP  0399850 A  11/1990

(Continued)

OTHER PUBLICATIONS

"Computerized Commerce", Danny Cohen, Information Processing 89, Aug. 28-Sep. 1, 1989.*

(Continued)

*Primary Examiner*—John W Hayes
*Assistant Examiner*—Rob Wu
(74) *Attorney, Agent, or Firm*—Van Pelt, Yi & James LLP (57) ABSTRACT

A method for selecting an optimal balance between direct cost and a number of suppliers, including soliciting bids from a plurality of suppliers for a plurality of lots, receiving at least one bid from a supplier for each lot, storing the bids from each supplier in a database, and generating at least a first and second optimal solution from the bids in the database, the first optimal solution having a different number of suppliers than the second optimal solution.

22 Claims, 4 Drawing Sheets

U.S. PATENT DOCUMENTS

| | | | |
|---|---|---|---|
| 5,727,165 A | 3/1998 | Ordish et al. | |
| 5,758,327 A | 5/1998 | Gardner et al. | |
| 5,758,328 A | 5/1998 | Giovannoli | |
| 5,765,138 A | 6/1998 | Aycock et al. | |
| 5,774,873 A | 6/1998 | Berent et al. | |
| 5,794,207 A | 8/1998 | Walker et al. | |
| 5,794,219 A | 8/1998 | Brown | |
| 5,797,127 A | 8/1998 | Walker et al. | |
| 5,799,151 A | 8/1998 | Hoffer | |
| 5,799,285 A | 8/1998 | Klingman | |
| 5,802,502 A | 9/1998 | Gell et al. | |
| 5,803,500 A | 9/1998 | Mossberg | |
| 5,809,483 A | 9/1998 | Broka et al. | |
| 5,826,244 A | 10/1998 | Huberman | |
| 5,832,496 A | 11/1998 | Anand et al. | |
| 5,835,896 A | 11/1998 | Fisher et al. | |
| 5,862,223 A | 1/1999 | Walker et al. | |
| 5,890,138 A | 3/1999 | Godin et al. | |
| 5,897,621 A | 4/1999 | Boesch et al. | |
| 5,905,974 A | 5/1999 | Fraser et al. | |
| 5,905,975 A * | 5/1999 | Ausubel | 705/37 |
| 5,915,209 A | 6/1999 | Lawrence | |
| 5,966,699 A | 10/1999 | Zandi | |
| 6,014,627 A | 1/2000 | Togher et al. | |
| 6,021,398 A | 2/2000 | Ausubel | |
| 6,023,685 A * | 2/2000 | Brett et al. | 705/37 |
| 6,026,383 A * | 2/2000 | Ausubel | 705/37 |
| 6,044,363 A | 3/2000 | Mori et al. | |
| 6,055,518 A | 4/2000 | Franklin et al. | |
| 6,058,379 A | 5/2000 | Odom et al. | |
| 6,061,663 A | 5/2000 | Bloom et al. | |
| 6,078,906 A | 6/2000 | Huberman | |
| 6,119,229 A | 9/2000 | Martinez et al. | |
| 6,151,589 A | 11/2000 | Aggarwal et al. | |
| 6,161,099 A | 12/2000 | Harrington et al. | |
| 6,199,050 B1 | 3/2001 | Alaia et al. | |
| 6,266,652 B1 | 7/2001 | Godin et al. | |
| 6,366,891 B1 | 4/2002 | Feinberg | |
| 6,397,197 B1 * | 5/2002 | Gindlesperger | 705/37 |
| 6,647,373 B1 * | 11/2003 | Carlton-Foss | 705/37 |
| 6,871,191 B1 * | 3/2005 | Kinney et al. | 705/37 |
| 2001/0037281 A1 * | 11/2001 | French et al. | 705/37 |
| 2002/0065762 A1 * | 5/2002 | Lee et al. | 705/37 |
| 2003/0004850 A1 * | 1/2003 | Li et al. | 705/37 |
| 2003/0046216 A1 * | 3/2003 | Kaplan | 705/37 |

FOREIGN PATENT DOCUMENTS

| | | |
|---|---|---|
| JP | 409101994 A | 4/1997 |
| JP | 410078992 A | 3/1998 |
| WO | WO 92/15174 | 9/1992 |
| WO | WO 97/37315 | 10/1997 |
| WO | WO 98/34187 | 8/1998 |
| WO | WO 99/63461 | 12/1999 |

OTHER PUBLICATIONS

Andrews, "Auctions Catch the Interest of Hobbyists and Big Business", Aug. 24, 1998.
Associated Press, "Auction on Web is Buyer's Market", Apr. 6, 1998.
"BroadVision Developing First Interactive Commerce Management System To Support Online Sales & Marketing Process; New Software Category Necessary to Interactive Network Architecture", Business Wire, p5150152, May 15, 1995.
Danny Cohen, "Computerized Commerce", Information Processing 89, Aug. 28-Sep. 1, 1989.
"FairMarket Launches New Self-Serve Auctions", Business Wire, p6161495, Jun. 16, 1998.
Jahnke, "How Bazaar", CIO Web Business Magazine, Aug. 27, 1998.
Jean-Pierre Banatre, et al., "The Design and Building of Enchere, a Distributed Electronic Marketing System" Communications of the ACM, No. 1, Jan. 29, 1986.
Lee, "Do electronic marketplaces lower the price of goods?", Communications of the PCM, v41n1 pp. 73-80, Jan. 1998.
Malone, et al., "The Logic of Electronic Markets", Harvard Business Review, No. 893II, May-Jun. 1989.
"Moai Technologies Introduces New categories of Business to Business Auction Software . . . ", Business Editors and Computer Writers, Mar. 16, 1998.
Kikuchi, et al., "Multi-Round Anonymous Auction Protocols", IEICE Trans. Inf. & Syst., vol. E82-D, No. 4, Apr. 1999.
"Online bidding software", Electronic Buyers' News, Issue 1072, p86, 1/6p, Aug. 25, 1997.
Sairamesh, et al., "Economic Framework for Pricing and Charging Digital Libraries", D-Lip Magazine, Feb. 1996.
"Sold! . . . To the Lowest Bidder", Computer Finance, v6, n2, Jul. 1995.
"Venture Capitalists Fund Two Massachusetts Internet Related Companies", Boston Globe, Jan. 14, 1998.
Vigoroso, "Buyers prepare for brave new world of e-commerce", Purchasing, v126, n6, pS4(1), Apr. 22, 1999.
Von der Fehr, et al., "Predatory bidding in sequential auctions", Oxford Economics Papers, v46, n3, p345(12), Jul. 1994.
"What you need to know to bid in FCC's narrowband auction", Washington Telecom News, v2, n26, p6(2), Jun. 27, 1994.
Wilder, "What's Your Bid?—FreeMarkets' real-time online bidding technology lets clients drive downcosts and improve product value", InformationWeek, Nov. 10, 1997.
Woolley, "E-muscle", Forbes, Mar. 9, 1998.

* cited by examiner

METHOD FOR SELECTING AN OPTIMAL BALANCE BETWEEN DIRECT COST AND A NUMBER OF SUPPLIERS

FIELD OF THE INVENTION

The invention relates generally to conducting online electronic auctions, and in particular, to generating optimal solutions for desired supply bases.

BACKGROUND OF THE INVENTION

Procurement Models

It is believed that procurement of goods and services has traditionally involved high transaction costs. The cost of finding and qualifying potential bidders has been particularly high. The advent of electronic commerce has introduced new methods of procurement that lower some of the transaction costs associated with procurement. Electronic procurement, and in particular business-to-business electronic procurement, matches buyers and suppliers and facilitates transactions that take place on networked processors.

Supplier-bidding auctions for products and services defined by a buyer have been developed. In a supplier-bidding auction, bid prices may start high and move downward in reverse-auction format as suppliers interact to establish a closing price. The auction marketplace is often one-sided, i.e., one buyer and many potential suppliers. It is believed that, typically, the products being purchased are components or materials. "Components" may mean fabricated tangible pieces or parts that become part of assemblies of durable products. Example components include gears, bearings, appliance shelves, or door handles. "Materials" may mean bulk quantities of raw materials that are further transformed into product. Example materials include corn syrup or sheet steel.

Industrial buyers may not purchase one component at a time. Rather, they may purchase whole families of similar components. These items may therefore be grouped into a single lot. Suppliers in industrial auctions may provide unit price quotes for all line items in a lot.

Auction Process

In many types of business transactions, price may not be the sole parameter upon which a decision is made. For example, in the negotiations for a supply contract, a buyer may compare various proposals not only on the basis of price but also on the basis of the non-price characteristics of non-standard goods, the location of the supplier, the reputation of the supplier, etc. In a typical business-to-business situation, a plurality of parameters may be considered in combination with the supplier's price proposal.

In these situations, purchasers may negotiate with each supplier independently because multi-parameter bids may not be readily compared. Actual comparisons by the purchaser may be based on a combination of subjective and objective weighting functions. Bidders may not have access to information on the buyer-defined weighting functions. At most, bidders may be selectively informed (at their disadvantage) of aspects of other competing bids. The limited communication of information between bidders may limit the potential of true competition between the bidders. The absence of competition may lower the likelihood that the bidders approach their true walk-away bid. Further, the manual weighting process may be time consuming and subject to inconsistency from one application to the next.

SUMMARY OF THE INVENTION

The invention provides a method for selecting an optimal balance between direct cost and a number of suppliers. This method includes soliciting bids from a plurality of suppliers for a plurality of lots, receiving at least one bid from a supplier for each lot, storing the bids from each supplier in a database, and generating at least a first and second optimal solution from the bids in the database. The first optimal solution has a different number of suppliers than the second optimal solution.

The invention provides another method for selecting an optimal balance between direct cost and a number of suppliers. This method includes identifying at least one of goods and services to be purchased, soliciting bids from a plurality of suppliers for a plurality of lots, receiving at least one bid from a supplier for each lot, storing the bids from each supplier in a database, inputting the bids into an optimization routine, including selecting the number of suppliers for at least a first and second optimal solution, determining lowest bids for the lots received from the number of suppliers for the lots for each optimal solution, and calculating a direct cost from the lowest bids received from the number of suppliers for each optimal solution, displaying each optimal solution, and choosing one of the optimal solutions.

The invention also provides a system for selecting an optimal balance between direct cost and a number of suppliers. This system includes a database for receiving and storing bid information from a plurality of suppliers for a plurality of lots and software for generating at least a first and second optimal solution from the bid information, the first optimal solution having a different number of suppliers than the second optimal solution.

The invention further provides a machine readable medium that selects an optimal balance between direct cost and a number of suppliers. This machine readable medium includes a first machine readable code that receives bid information from a plurality of suppliers for a plurality of lots, a second machine readable code that generates at least a first and second optimal solution from the bid information, and a third readable code that transmits the optimal solutions to a buyer. The first optimal solution has a different number of suppliers than the second optimal solution.

BRIEF DESCRIPTION OF THE DRAWINGS

The accompanying drawings, which are incorporated herein and constitute a part of this specification, illustrate the presently preferred embodiments of the invention and, together with the general description given above and the detailed description given below, serve to explain the features of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks.

The invention provides a method for selecting an optimal balance between direct cost and a number of suppliers. The invention is designed to create a market of competition in business transactions that traditionally could not take advantage of natural auction dynamics. The method is particularly applicable to online auctions where bidders submit bids to an auction coordinator electronically during the auction process. The method provides optimal solutions with a two-dimensional array of suppliers versus lots. The buyer may choose the best optimal solution for his particular situation based on the desired number of suppliers and the direct cost, or total cost, to purchase the lots from those suppliers.

The following description of the features of the present invention is presented in the context of downward-based online industrial auctions. However, as would be appreciated by one of ordinary skill in the relevant art, these inventive features could also be applied in the context of upward-based online auctions as well.

Figure 1A:
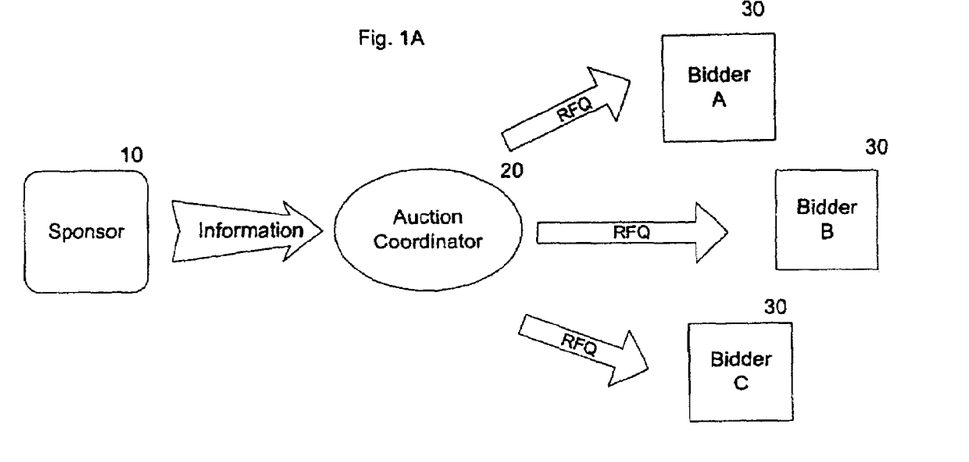
FIG. 1A is a flow diagram of a request for quotation in an auction.

The basic process for a purchaser sponsored supplier-bidding or reverse auction, as conducted by the assignee of the present invention, is described below with reference to FIG. 1. FIG. 1 illustrates the functional elements and entities involved in setting up and conducting a typical supplier-bidding auction. FIG. 1A illustrates the creation of an auctioning event, FIG. 1B illustrates the bidding during an auction, and FIG. 1C illustrates results after completion of a successful auction.

In the supplier-bidding reverse auction model, the product or service to be purchased is, preferably, defined by the sponsor, or originator, 10 of the auction, as shown in FIG. 1A. Alternatively, the buyer may set up all or some of its own bidding events and find its own suppliers. In that case, the sponsor 10 would run the events through a market operations center, which is a facility where auctions are monitored and participants receive assistance. If the sponsor 10 decides to use the auctioning system of the present invention to procure products or services, the sponsor 10 may provide information to an auction coordinator 20. That information may include information about incumbent suppliers and historic prices paid for the products or services to be auctioned, for example. Preferably, the sponsor 10 also works with the auction coordinator 20 to define the products and services to be purchased in the auction and lot the products and services appropriately so that desired products and services can be procured using optimal auction dynamics. A specification may then be prepared for each desired product or service, and a Request for Quotation ("RFQ") may be generated for the auction.

Next, the auction coordinator 20 may identify potential suppliers 30, preferably with input from the sponsor 10, and invite the potential suppliers 30 to participate in the upcoming auction. The suppliers, or bidders, 30 that are selected to participate in the auction may become bidders 30 and may be given access to the RFQ, typically through an RFQ in a tangible form, such as on paper or in an electronic format.

Figure 1B:
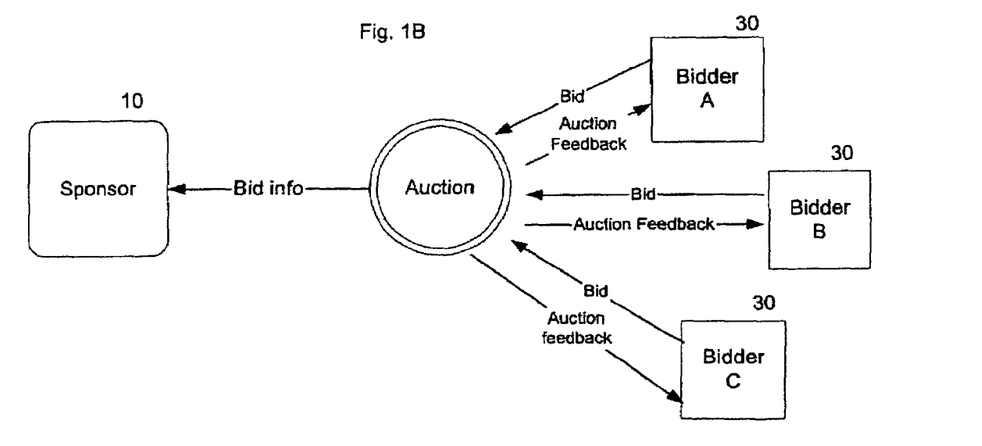
FIG. 1B is a flow diagram of a bidding process in an auction.
Figure 1C:
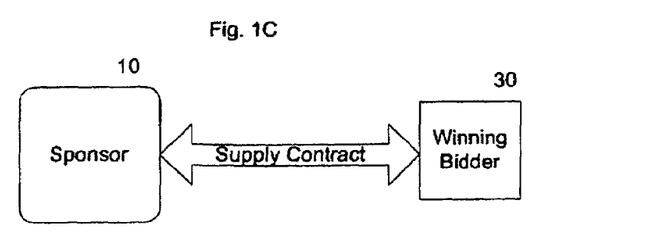
FIG. 1C is a flow diagram of a contract award following an auction.

As shown in FIG. 1B, during a typical auction, bids are made for lots. Bidders 30 may submit actual unit prices for all line items within a lot, however, the competition in an auction is typically based on the aggregate value bid for all line items within a lot. The aggregate value bid for a lot may, therefore, depend on the level and mix of line item bids and the quantity of goods or services that are offered for each line item. Thus, bidders 30 submitting bids at the line item level may actually be competing on the lot level. During the auction, the sponsor 10 may typically monitor the bidding as it occurs. Bidders 30 may also be given market feedback during the auction so that they may bid competitively.

After the auction, the auction coordinator 20 may analyze the auction results with the sponsor 10. The sponsor 10 may conduct final qualification of the low bidding supplier or suppliers 30. The sponsor 10 may furthermore retain the right not to award business to a low bidding supplier 30 based on final qualification or other business concerns. As shown in FIG. 1C, a supply contract may be drawn up for the winning bidder 30 and executed based on the results of the auction.

The auction may be conducted electronically between bidders 30 at their respective remote sites and the auction coordinator 20 at its site. Alternatively, instead of the auction coordinator 20 managing the auction at its site, the sponsor 10 may perform auction coordinator tasks at its site.

Figure 2:
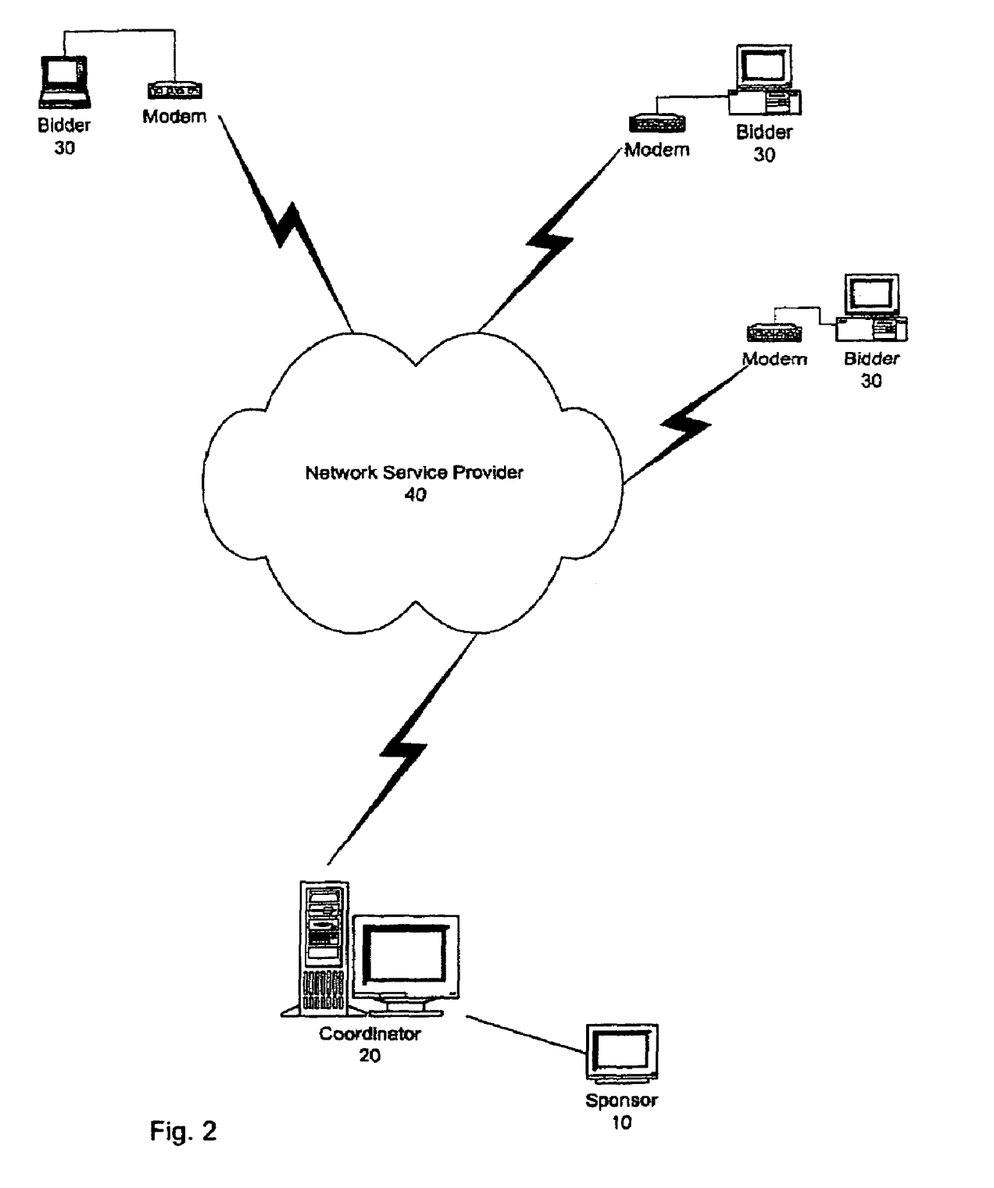
FIG. 2 is a schematic illustration of communications links between the coordinator, the buyer, and the suppliers in an auction.

Information may be conveyed between the coordinator 20 and the bidders 30 via any communications medium. As shown in FIG. 2, bidders 30 may be connected to the auction through the Internet via a network service provider 40 accessed, for example, through a dial-up telephone connections. Alternatively, sponsors 10 and bidders 30 may be coupled to the auction by communicating directly with the auction coordinator 20 through a public switched telephone network, a wireless network, or any other connection.

Figure 3:
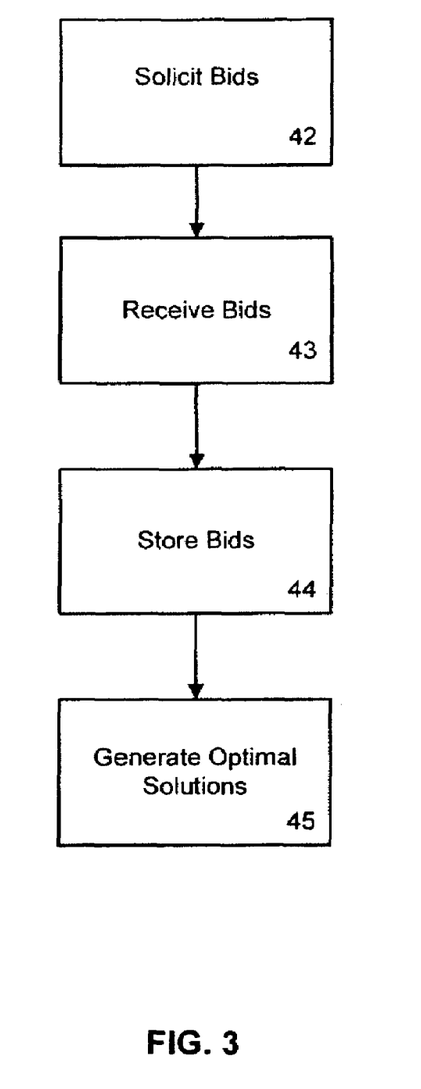
FIG. 3 is a block flow diagram of an embodiment of the method of the invention.

In the preferred embodiment, bids are solicited by the auction coordinator 20 for a plurality of lots in step 42, as shown in FIG. 3. Preferably, the auction coordinator 20 identifies the goods and/or services to be purchased. Bids are received from bidders, or suppliers, 30 for each lot in step 43. The suppliers 30 may bid on all of the lots available, only one lot, or any number of lots in between. In step 44, the bids received from the suppliers 30 are stored in a database. In step 45, the optimal solutions are generated from the lowest bids in the database. These optimal solutions have a number of suppliers and a lowest cost calculated from the lowest bids received from the number of suppliers for the lots. As such, the lowest cost should vary as to the number of suppliers chosen. Although the cost usually increases as the number of suppliers decreases, optimal solutions with less suppliers may be desired because of shipping costs, relationships, paper work, and other factors associated with the suppliers.

The optimal solutions may be generated by inputting the bids into an optimization routine that selects the number of suppliers, determines the lowest bids for the lots received from the number of suppliers, and calculates the optimal solutions. In calculating the optimal solution, the optimization routine generates a family of lot-supplier assignments, starting with a family that has the lowest cost, but which may have a large number of suppliers. The routine subsequently generates optimal solutions that balance the conflicting goals of having a low cost and few suppliers.

More specifically, the optimization routine generates the optimal solutions by determining the number of suppliers that yields the lowest cost. In an initial solution, the lowest possible assignment includes, for each lot, the supplier with the lowest bid for that lot, where K represents the number of suppliers in the assignment. This initial solution has the lowest possible overall cost, but usually includes a large number of suppliers. It is then desirable to generate a family of nearoptimal solutions that utilize fewer suppliers, which are represented by N. For each subsequent step after the initial solution, an optimal solution is generated for N suppliers, where N=K−1, K−2, K−3, . . . until K is 0 or a prespecified maximum number of suppliers from the buyer. Integer programming, where binary decision variables represent the suppliers that are chosen and the assignment of each lot to a supplier, is used to minimize the overall bidding cost for each N. The constraints of the optimization routine include: the number of chosen suppliers should not exceed N, each lot must be assigned to at least one supplier, and such a supplier must be chosen. The results may be reported in a spreadsheet format using a spreadsheet program.

In one example of the preferred embodiment, if four suppliers submit bids for four lots, then each of the four suppliers may bid on at least one of the first, second, third and fourth lots. The optimal solutions that are calculated may be a first, or best, optimal solution with a first cost for three suppliers and a second, or second best, optimal solution with a second cost for two suppliers. The first optimal may list the first supplier as the provider for at least one of the first, second, third, and fourth lots, the third supplier as the provider for at least one of the first, second, third, and fourth lots, and the fourth supplier as the provider for at least one of the first, second, third, and fourth lots. The second optimal solution may list the third supplier as the provider for at least one of the first, second, third, and fourth lots, and the fourth supplier as the provider for at least one of the first, second, third, and fourth lots. Each optimal solution will provide a supplier for each of the lots.

In another example, suppliers 49237, 49451, 49573, 49599, 49613, 49624, 58363, 76009, 77530, 77539, 77735, and 78060 bid on lots 3 through 7, as shown in Table 1:

TABLE 1

| Lot ID | Lowest Bid | 49237 | 49451 | 49573 | 49599 | 49613 | 49624 | 58363 | 76009 | 77539 | 77735 | 78060 |
|---|---|---|---|---|---|---|---|---|---|---|---|---|
| 3 | $825251 | | | | | $825251 | $916924 | | $922478 | | | |
| 4 | $829432 | | | | $829432 | $833601 | $921753 | | $903565 | | | |
| 5 | $854010 | | | $862661 | | | | | | | | $854010 |
| 6 | $828899 | | | $867155 | | | | | | | | $828899 |
| 7 | $592158 | $848882 | $592158 | $753267 | | | | $595134 | $848827 | | | |
| 8 | $729609 | | | | | | | | | $828042 | $733276 | $729609 |
| 9 | $586075 | $586075 | | | | | | | $601936 | | | |

A minimum amount of money to be paid was chosen by the buyer so that the number of suppliers could be reduced from the eleven bidders. The best optimal solution was calculated using the minimum price of $5,245,434 and the lowest bid for each lot for five bidders as shown in Tables 2 and 3:

TABLE 2

| Lot ID | 49237 | 49451 | 49599 | 49613 | 78060 |
|---|---|---|---|---|---|
| 3 | | | | $825251 | |
| 4 | | | $829432 | $833601 | |
| 5 | | | | | $854010 |
| 6 | | | | | $828899 |
| 7 | $848828 | $592158 | | | |
| 8 | | | | | $729609 |
| 9 | $586075 | | | | |

TABLE 3

| Lot ID | Supplier | Cost |
|---|---|---|
| 3 | 49613 | $825251 |
| 4 | 49599 | $829432 |
| 5 | 78060 | $854010 |
| 6 | 78060 | $828899 |
| 7 | 49451 | $592158 |
| 8 | 78060 | $729609 |
| 9 | 49237 | $586075 |

For the best optimal solution, the direct, or total, cost to the buyer would be $5,245,434.

The second best optimal solution was calculated based on buying the lots from four suppliers, as shown in Tables 4 and 5:

TABLE 4

| Lot ID | 49237 | 49451 | 49613 | 78060 |
|---|---|---|---|---|
| 3 | | | $825251 | |
| 4 | | | $833601 | |
| 5 | | | | $854010 |
| 6 | | | | $828899 |
| 7 | $848882 | $592158 | | |
| 8 | | | | $729609 |
| 9 | $586075 | | | |

TABLE 5

| Lot ID | Supplier | Cost |
|---|---|---|
| 3 | 49613 | $825251 |
| 4 | 49613 | $833601 |
| 5 | 78060 | $854010 |
| 6 | 78060 | $828899 |
| 7 | 49451 | $592158 |
| 8 | 78060 | $729609 |
| 9 | 49237 | $586075 |

The total cost to the buyer for the second best optimal solution would be $5,249,603.

The optimal solution may be adjusted according to the preference of the buyer. For example, if the buyers a particular supplier 30, the bids from that supplier 30 may be included in the optimal solution, although the bids may not be the lowest bids for the particular lot. Alternatively, if the buyer wishes to have a certain supplier 30 removed from consideration, that supplier's bids may be removed from the database and not considered in generating the optimal solution.

Figure 4:
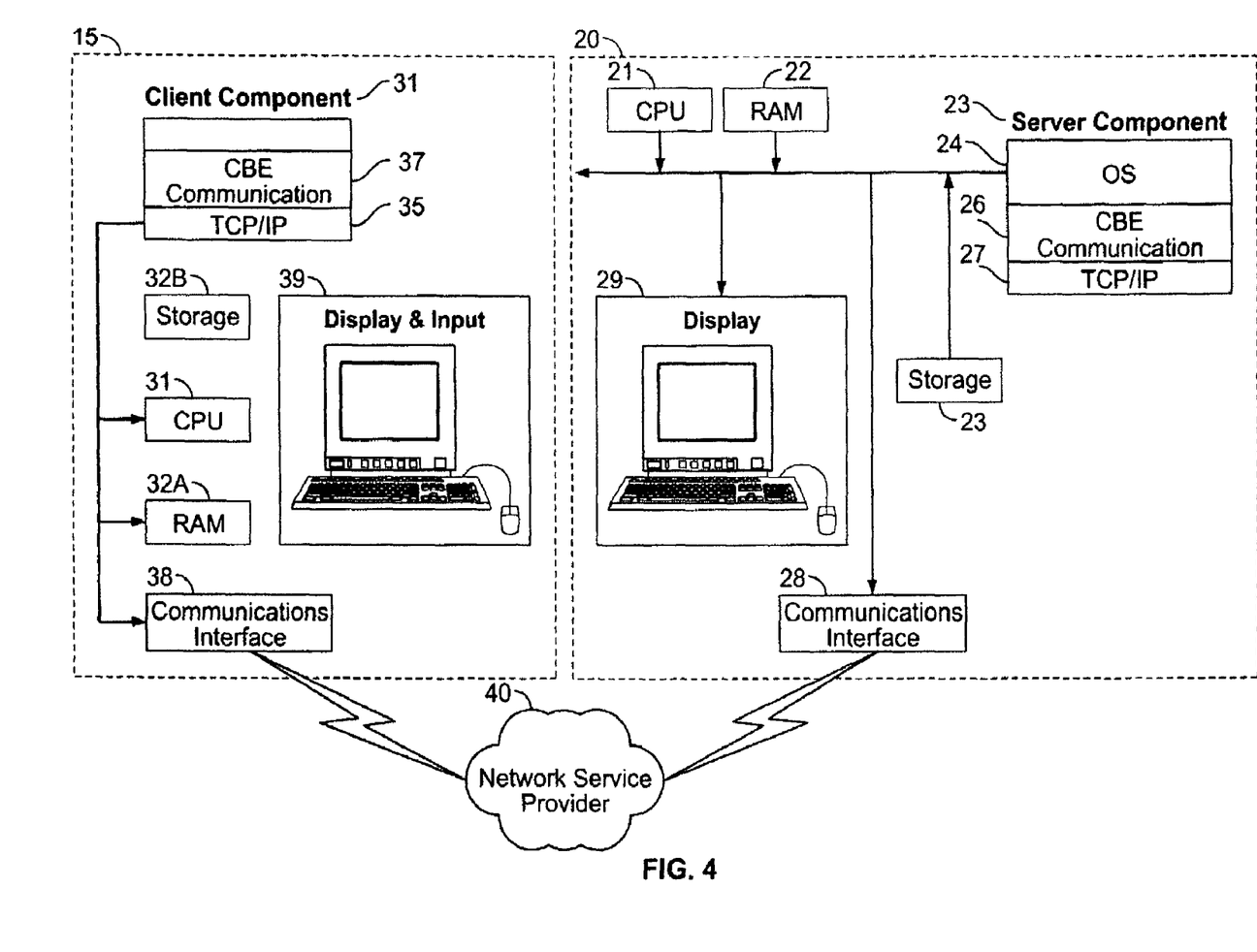
FIG. 4 is a schematic illustration of auction software and computers hosting that software in an auction.

A computer software application may be used to manage the auction. Preferably, as shown in FIG. 4, the software application has two components: a client component 16 and a server component 23. The client component 16 may operate on a computer at the site of each of the potential suppliers 30. Suppliers 30 make bids during the auction using the client component 16. The bids may be sent via the network service provider 40 to the site of the coordinator, where it is received by the server component 23 of the software application. The client component 16 may include software used to make a connection through telephone lines or the Internet to the server component 23. Bids may be submitted over this connection and updates may be sent to the connected suppliers.

Bids may only be submitted using the client component 16 of the application. This ensures that buyers do not circumvent the bidding process, and that only invited suppliers participate in the bidding. Bidders may see their bids and bids placed by other suppliers for each lot on the client component 16. When a bidder submits a bid, that bid is sent to the server component 23 and evaluated to determine whether the bid is from an authorized bidder and whether the bid has exceeded a pre-determined maximum acceptable price. Bids placed by a supplier may be broadcast to all connected bidders, thereby enabling every participating bidder to quickly view the change in market conditions and begin planning their competitive responses.

The embodiments of the invention may be implemented by a processor-based computer system. The system includes a database for receiving and storing bid information for a plurality of lots and software for generating optimal solutions from the bid information based on the number of suppliers and lowest cost calculated from the number of suppliers for the lots. The bid information includes at least one bid from a supplier 30 for each lot, and the optimal solution includes a chosen supplier 30, whether chosen by the optimization routine or the buyer, for each lot.

With reference to FIG. 4, a computer system 20 operates to execute the functionality for server component 23. Computer system 20 includes a processor 21, a memory 22 and a disk storage 23. Memory 22 stores computer program instructions and data. Processor 21 executes the program instructions or software, and processes the data, stored in memory 22. Disk storage 23 stores data to be transferred to and from memory 22. All these elements are interconnected by one or more buses, which allows data to be intercommunicated between the elements.

Processor 21 may be any type of processor capable of providing the speed and functionality required by the embodiments of the invention. For example, processor 21 could be a processor from a family of processors made by INTEL CORPORATION™ or MOTOROLA™.

For purposes of this application, memory 22 and disk 23 are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system 20 may contain various combinations of machine readable storage devices, which are accessible by processor 21 and which are capable of storing a combination of computer program instructions and data.

Memory 22 is accessible by processor 21 over a bus and includes an operating system, a program partition and a data partition. The program partition stores and allows execution by processor 21 of program instructions that implement the functions of each respective system described herein. The data partition is accessible by processor 21 and stores data used during the execution of program instructions. For some embodiments of the invention, the program partition contains program instructions that performs the buy versus leasing transformation functionality described above.

Computer system 20 also includes input and output devices 29, such as a monitor, printer, mouse, and keyboard, and a network interface 28. Network interface 28 may be any suitable means for controlling communication signals between network devices using a desired set of communications protocols, services and operating procedures. Communication protocols are layered, which is also referred to as a protocol stack, as represented by operating system 24, a CBE-communication layer 26, and a Transport Control Protocol/Internet Protocol (TCP/IP) layer 27. Network interface 28 also includes connectors for connecting interface 28 with a suitable communications medium. Those skilled in the art will understand that network interface 28 may receive communication signals over any suitable medium such as twisted-pair wire, co-axial cable, fiber optics, radio-frequencies, and so forth.

FIG. 4 also shows a computer system 15 that operates to execute the functionality for client component 16. Computer system 15 includes a processor 31, a memory 32A, disk storage 32B, a communications interface 38, input and output devices 39, and a protocol stack having a CBE-communication layer 37 and a TCP/IP layer 35. These elements operate in a manner similar to the corresponding elements for computer system 20.

Another embodiment of the invention includes a machine readable medium for selecting an optimal balance between direct cost and a number of suppliers. The machine readable medium includes a first machine readable code that receives and stores bid information from bidders for a plurality of lots, a second machine readable code that generates optimal solutions from the bid information based on a number of suppliers and a lowest cost calculated from lowest bids received from the number of suppliers for the lots, and a third machine readable code that transmits the optimal solutions to a buyer.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed is:

1. A computer-implemented method for selecting an optimal balance between direct cost and a number of suppliers comprising:

soliciting bids from a plurality of suppliers for a plurality of lots;

storing bid information from a plurality of suppliers for a plurality of lots in a database; and upon completion of bidding for the plurality of lots:
determining using a computer a first optimal solution that includes an initial family of lot-supplier assignments; and:
if the first optimal solution has the lowest cost value:
performing multiple iterations of the following steps:
decreasing the number of suppliers in the family to form a reduced family;
determining a revised cost value for the reduced family; and
generating a second solution having the decreased number of suppliers; and
if the first optimal solution has the highest cost value:
performing multiple iterations of the following steps:
increasing the number of suppliers in the family to form an increased family;
determining a revised cost value for the increased family; and
generating a second solution having the increased number of suppliers.

2. The method of claim 1 wherein the generating comprises:
inputting the bids into an optimization routine, including selecting the number of suppliers for each optimal solution, determining lowest bids received from the number of suppliers for the lots for each optimal solution, calculating a direct cost from the lowest bids received from the number of suppliers for each optimal solution; and providing each optimal solution to a buyer.

3. The method of claim 1 wherein the generating comprises:
choosing a minimum cost; and
determining the optimal solution with a direct cost being at least the minimum cost.

4. The method of claim 1 wherein the storing comprises:
removing the bids from at least one undesired supplier.

5. The method of claim 4 wherein the generating comprises:
providing the optimal solution with lowest bids from the suppliers other than the at least one undesired supplier.

6. The method of claim 1 wherein the storing comprises:
choosing the bids from at least one preferred supplier.

7. The method of claim 6 wherein the generating comprises:
providing the optimal solution with lowest bids from the at least one preferred supplier for the lots on which the at least one preferred supplier bid lower than other suppliers and lowest bids from the other suppliers for the lots on which the at least one preferred supplier did at least one of not bid and not bid the lowest bid.

8. The method of claim 1 wherein the generating comprises:
ranking the bids in accordance with cost.

9. The method of claim 1 wherein the soliciting comprises:
identifying at least one of goods and services to be purchased.

10. The method of claim 1 further comprising:
displaying at least one of the first and second optimal solutions.

11. The method of claim 1 wherein the generating comprises:
assigning an integer value to each lowest bid in each lot.

12. The method of claim 1 wherein the bid information comprises: at least one bid on a first second, third, and fourth lot from a first supplier; at least one bid on the first, second, third, and fourth lots from a second supplier, at least one bid on the first, second, third, and fourth lots from a third supplier, and at least one bid on the first, second, third, and fourth lots from a fourth supplier.

13. The method of claim 12 wherein the first and second optimal solutions comprise: the first optimal solution, having a first cost, for three suppliers, the first optimal solution listing the first supplier as a provider for at least one of the first, second, third and fourth lots, and having a first cost, the third supplier as the provider for at least one of the first, second, third, and fourth lots, and the fourth supplier as the provider for at least one of the first, second, third and fourth lots; and the second optimal solution, having a second cost, for two suppliers, the second optimal solution listing the third supplier as the provider for at least one of the first, second, third, and fourth lots, and the fourth supplier as the provider for at least one of the first, second, third and fourth lots.

14. The method of claim 1 further comprising: selecting one of the optimal solutions.

15. A system for selecting an optimal balance between direct cost and a number of suppliers comprising:
a database for receiving and storing bid information from a plurality of suppliers for a plurality of lots; and
a processor in communication with the database and configured to, upon completion of bidding for the plurality of lots:
determine a first optimal solution that includes an initial family of lot-supplier assignments; and:
if the first optimal solution has the lowest cost value:
perform multiple iterations of the following steps:
decreasing the number of suppliers in the family to form a reduced family;
determining a revised cost value for the reduced family; and
generate a second solution having the decreased number of suppliers;and
if the first optimal solution has the highest cost value:
perform multiple iterations of the following steps:
increasing the number of suppliers in the family to form an increased family;
determining a revised cost value for the increased family; and
generate a second solution having the increased number of suppliers.

16. The system of claim 15 wherein the bid information comprises at least one bid from a supplier for each lot.

17. The system of claim 15 wherein at least one of the first and second optimal solutions comprises a chosen supplier for each lot.

18. A computer program product for selecting an optimal balance between direct cost and a number of suppliers, the computer program product being embodied in a computer readable medium and comprising computer instructions for:
receiving and storing bid information from a plurality of suppliers for a plurality of lots;
upon completion of bidding for the plurality of lots:
determining a first optimal solution that includes an initial family of lot-supplier assignments and:
if the first optimal solution has the lowest cost value:
performing multiple iterations of the following steps:
decreasing the number of suppliers in the family to form a reduced family;
determining a revised cost value for the reduced family; and
generating a second solution having the decreased number of suppliers; and
if the first optimal solution has the highest cost value:

performing multiple iterations of the following steps:
   increasing the number of suppliers in the family to form an increased family;
   determining a revised cost value for the increased family; and
   generating a second solution having the increased number of suppliers 19. The computer program product of claim 18 wherein the bid information comprises at least one bid from a supplier for each lot.

20. The computer program product of claim 18 wherein at least one of the first and second optimal solutions comprise a chosen supplier for each lot.

21. The computer program product of claim 18 wherein the bid information comprises: at least one bid on a first, second, third, and fourth lot from a first supplier; at least one bid on the first, second, third, and fourth lots from a second supplier, at least one bid on the first, second, third, and fourth lots from a third supplier, and at least one bid on the first, second, third, and fourth lots from a fourth supplier.

22. The computer program product of claim 21 wherein the first and second optimal solutions comprise: the first optimal solution, having a first cost, for three suppliers, the first optimal solution listing the first supplier as a provider for at least one of the first, second, third and fourth lots, and having a first cost, the third supplier as the provider for at least one of the first, second, third, and fourth lots, and the fourth supplier as the provider for at least one of the first, second, third and fourth lots; and the second optimal solution, having a second cost, for two suppliers, the second optimal solution listing the third supplier as the provider for at least one of the first, second, third, and fourth lots, and the fourth supplier as the provider for at least one of the first, second third and fourth lots.

* * * * *

UNITED STATES PATENT AND TRADEMARK OFFICE
CERTIFICATE OF CORRECTION

PATENT NO. : 7,536,362 B2  
APPLICATION NO. : 10/045503  
DATED : May 19, 2009  
INVENTOR(S) : Starr et al.

Page 1 of 1

It is certified that error appears in the above-identified patent and that said Letters Patent is hereby corrected as shown below:

Claim 12  
Column 9, line 66 delete "first second" and insert -- first, second --

Claim 15  
Column 10, line 36 delete "suppliers;and" and insert -- suppliers; and --

Signed and Sealed this

Twenty-second Day of September, 2009

David J. Kappos  
*Director of the United States Patent and Trademark Office*